Aug. 28, 1951   C. V. McGUIRE   2,565,870
SEAT
Filed Feb. 21, 1947   2 Sheets-Sheet 1
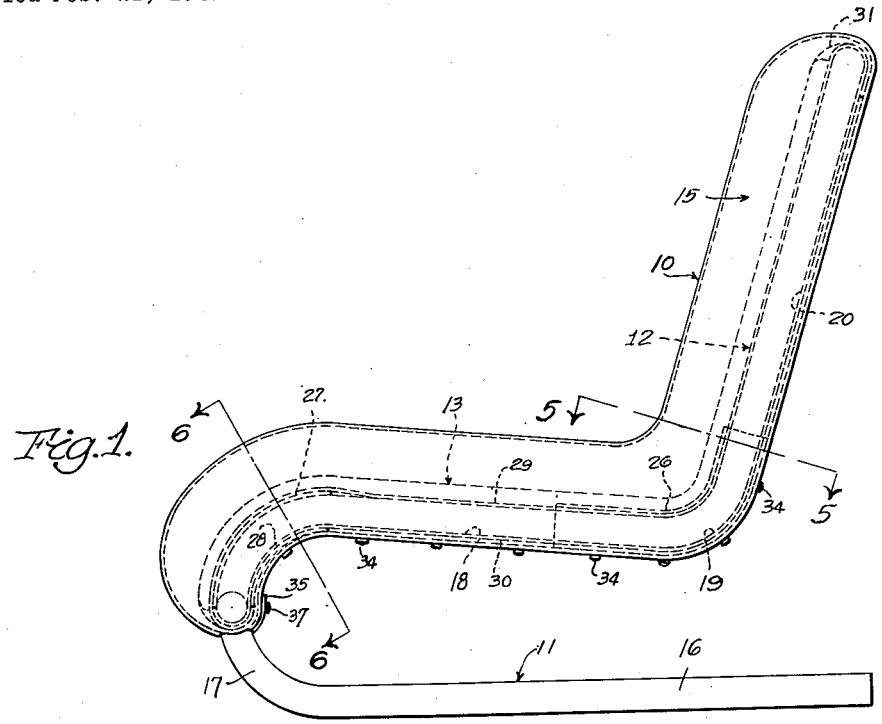
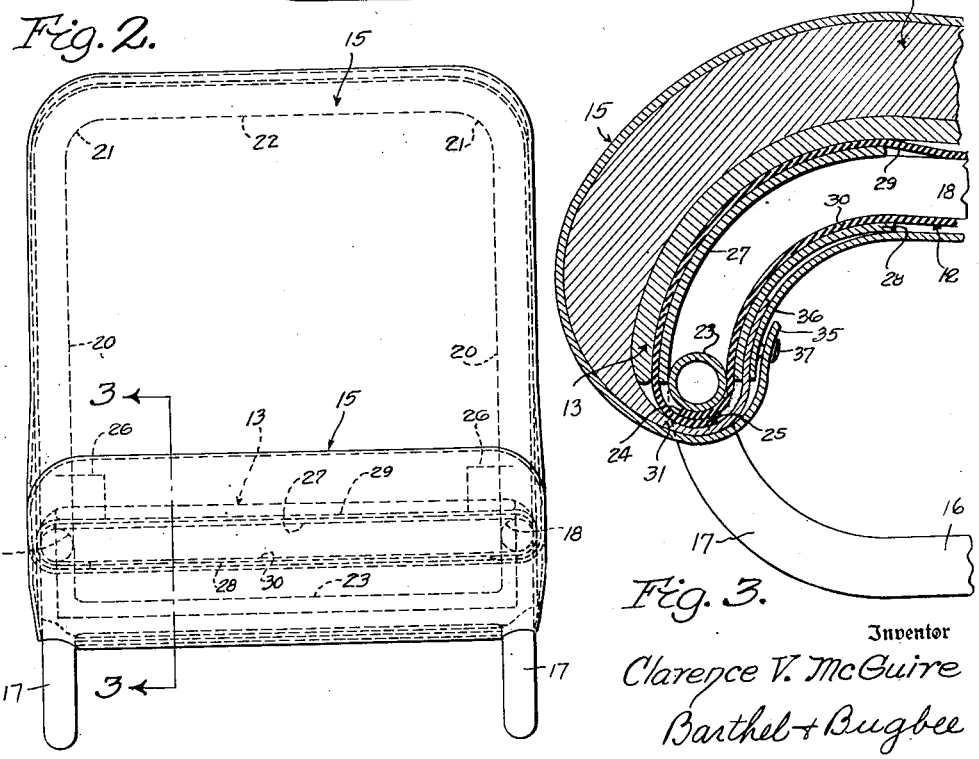
Inventor
Clarence V. McGuire
Barthel + Bugbee
Attorneys Aug. 28, 1951 — C. V. McGUIRE — 2,565,870
SEAT
Filed Feb. 21, 1947 — 2 Sheets-Sheet 2
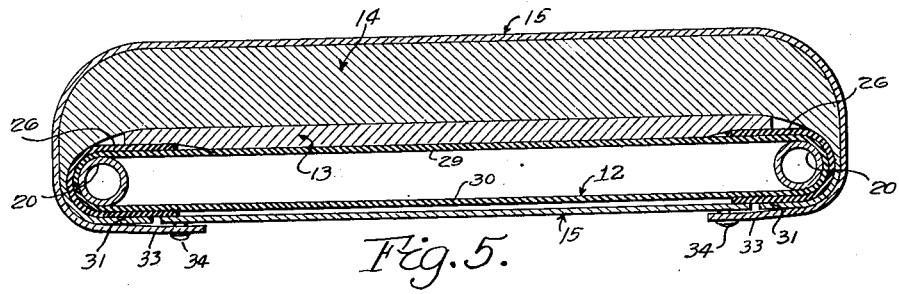
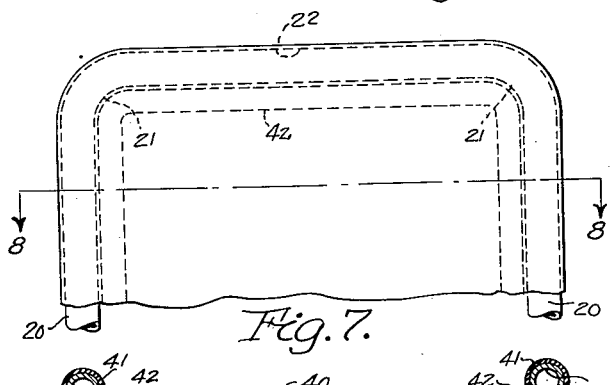
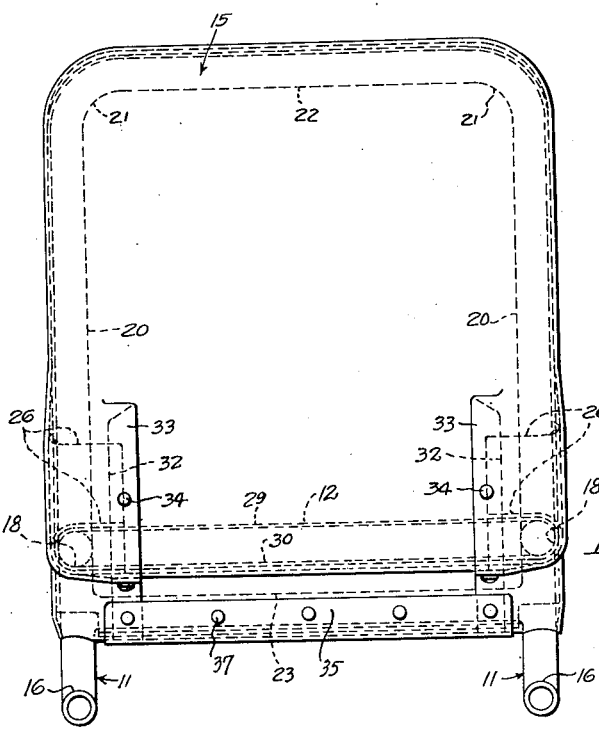
Inventor
Clarence V. McGuire
Barthel + Bugbee
Attorneys Patented Aug. 28, 1951

2,565,870

UNITED STATES PATENT OFFICE 2,565,870

SEAT

Clarence V. McGuire, Grosse Pointe, Mich.

Application February 21, 1947, Serial No. 729,995

6 Claims. (Cl. 155—187)

1

This invention relates to seats and in particular to resilient seats.

One object of this invention is to provide a seat of strong yet simple and inexpensive construction which gives increased comfort to the user and which is adaptable not only to vehicle and aircraft installations, but also to seating purposes in general.

Another object is to provide a seat wherein a resilient envelope of rubber-like material is mounted over a frame and provided with cushioning and covering as desired.

Another object is to provide a seat as set forth in the preceding objects wherein the frame is approximately U-shaped or loop-shaped and wherein the rubber-like envelope is stretched over the top and side portions of the frame.

Another object is to provide a seat as set forth in the preceding objects, wherein the frame is constructed of tubular metal, stamped metal, plywood or the like, preferably of a resilient character so as to provide an inherent spring action which assists in absorbing jolts or other shocks.

Another object is to provide a seat, as set forth in the preceding objects wherein a cushion of sponge rubber or foam latex or the like is superimposed upon the rubber-like envelope so as to increase the comfort thereof.

Another object is to provide a seat, as set forth in the object immediately preceding, wherein an additional supporting layer of molded cellular elastic or sheet elastic material is inserted between the sponge rubber cushion and the envelope in order to prevent oversagging of the cushion and protect the user from contact with the tubular side members of the frame in entering or leaving the seat.

Another object is to provide a seat, as set forth in the preceding objects, wherein the envelope is reinforced by elastic strips cemented to the edges at the bending point in the back of the frame so as to reinforce the envelope at the location of its greatest stress.

Another object is to provide a seat, as set forth in the preceding objects, wherein one or more curved or otherwise contoured shaping plates of sheet metal, plastic, plywood, screening or the like is installed at the portion of the frame beneath the knees of the user so as to prevent distortion or sagging of the envelope and cushion at that location and at the same time to give additional support to the knees, and also to cause the material to curve properly with the frame rather than pucker or wrinkle.

2

In the drawings:

Figure 1 is a side elevation of a resilient seat according to a preferred form of the invention;

Figure 2 is a front elevation of the seat shown in Figure 1;

Figure 3 is an enlarged fragmentary vertical section through the front or knee portion of the seat taken along the line 3—3 in Figure 2;

Figure 4 is a rear elevation of the seat shown in Figure 2;

Figure 5 is an inclined, nearly horizontal section through the back portion of the seat immediately above the bend thereof, taken along the line 5—5 in Figure 1;

Figure 6 is an inclined, nearly vertical section through the front portion of the seat, taken along the line 6—6 in Figure 1;

Figure 7 is a fragmentary front elevation of the upper portion of a modified seat employing a sheet of rubber-like material lapped around the frame rather than a double-walled envelope, with the cushioning and covering omitted; and Figure 8 is a horizontal section along the line 8—8 in Figure 7.

Referring to the drawings in detail, Figure 1 shows a resilient seat, generally designated 10, according to a preferred form of the invention, as consisting generally of a U-shaped or loop-shaped tubular frame 11, an envelope 12 of rubber-like material, a supporting pad 13 of molded cellular elastic, a cushion 14 of foam rubber or sponge rubber and a textile covering 15. The frame 11 is preferably constructed of metal tubing but may also employ stamped metal or plywood and includes approximately parallel horizontal base portions 16, curved front portions 17, approximately horizontal bottom portions 18, curved portions 19 between the bottom portions 18 and the back portions 20, and curved corner portions 21 leading into a horizontal top portion 22. The side portions 16 to 20 inclusive of the frame 11 lie in approximately parallel vertical planes (Figure 2) and at their forward portions 17 are preferably interconnected by a cross member 23 of tubular metal, stamped metal, plywood, or the like (Figure 3), the opposite ends of which are welded or otherwise suitably secured to the curved portions 17.

The envelope 12 consists of an elongated sleeve or bag-like member of elastic deformable material such as rubber, synthetic rubber or the like which is closed at its top and side edges and is originally open at its bottom edge. The envelope 12 is made by any suitable process, such as by dipping, molding or vulcanizing elastic sheets at their edges so that it is substantially air-tight except at its open lower edge. The envelope 12 is drawn over the upper portions 20, 21 and 22 like a glove, sock or mitten down as far as the curved portions 19.

In practice it is found preferable to overlap the lower portions of the envelope and to first work the upper portion into position with the lower portion in overlapping folds, rather than attempting to draw the entire envelope over the frame by pulling along its lower edges. The latter method is less successful due to the friction occurring between the frame and the envelope. After the upper portion of the envelope has been properly installed, the overlapped or folded lower portions can then be straightened out and drawn around the curved frame portions 19 and 17 with the lower edges 24 and 25 overlapped and cemented or vulcanized together.

The envelope 12 is reinforced adjacent the curved frame portions 19 between the bottom portions 18 and back portions 20 by side strips or reinforcements 26 (Figure 5) cemented, vulcanized or otherwise secured to the envelope 12. In this manner, the envelope 12 is strengthened at locations of great stress. In order to cause the lower portions of the envelope 12 to curve properly around the curved frame portions 17 beneath the knees of the user, a contoured shaping plate 27 (Figure 3) is inserted within the envelope in contact with the curved frame portions 17 and cross member 23 and secured thereto in any suitable manner, as by welding. An additional contoured shaping plate 28 is installed outside the envelope 12 beneath the curved frame portion 17. The front and rear shaping plates 27 and 28 support the front and rear wall portions 29 and 30 of the envelope 12.

The supporting layer 13 is preferably of molded cellular elastic or sheet elastic material and is super-imposed upon the front wall portion 29 of the envelope 12, extending from approximately the upper top frame portion 22 to the cross member 23. This supporting layer 13 gives additional support to the cushion 14, prevents over-sagging of the cushion and protects the user from colliding with the side portions of the frame 11 when entering or leaving the seat. The layer 13 may be formed, for example, of cellular material, such as that shown in the McGuire Patent No. 2,268,049, issued December 30, 1941.

The cushion 14, as previously stated, is preferably of foam rubber or sponge rubber, but also may be of other cellular elastic or fibrous material. If the cushion 14 is of rubber-like material it is preferably attached to the frame 11 by means of strap or fin portions 31 at its edges (Figures 3, 5 and 6). The portions 31 are preferably bent around the frame portion 22 and the cross member 23 and secured in position by cementing or vulcanizing.

In order to cover the seat and protect the user from direct contact with the sponge rubber cushion 14, cover 15 of textile material is drawn over the above-described parts after they have been assembled. The cover 15 consists of an envelope or bag-like member of cloth or other suitable flexible material which is closed at its upper end as far down as the bent frame portion 19 and is there provided with a slit 32 (Figures 1 and 4) at each side thereof closed by flaps 33 having fasteners 34 secured at intervals therealong. These fasteners 34 may be of the conventional type known as glove fasteners. The lower edge portion of the cover 15 is also provided with a flap 35 which is overlapped with the rear edge portion 36 (Figure 3) and detachably secured thereto by fasteners 37 of the same glove fastener type (Figure 4). The cover 15 is drawn over the upper portions of the seat like a hood or mitten, the lower side portions being open and unfastened to facilitate this. After the upper portion of the cover 15 is in position and the wrinkles have been smoothed out, the lower portion thereof may be then tightened and the sides and bottom edges closed by means of the fasteners 34 and 37. The cover 15 may be easily removed and washed, or an additional slip cover (not shown) which is quickly and easily detachable, may be superimposed on the cover 15.

The modification shown in Figures 7 and 8 employs a frame 11 identical with the frame in the principal form of the invention and has similar side portions 20, curved corner portions 21 and a top cross portion 22. Instead of the double-walled envelope 12, however, a single-walled member 40 is stretched between the side members of the frame and over the top cross member 22 and bottom cross member 23. The free edge portions 41 are brought around the adjacent frame portion and cemented, vulcanized or otherwise secured as at 42 to the member 40 (Figure 8), with or without the reinforcements 26. The cushion 14 with or without the supporting layer 13 is then superimposed upon the member 40 and covered with the cover 15. The shaping plate 27 and other features of the principal form of the invention may also be used in the modification of Figures 7 and 8.

The contoured shaping plate 27 is secured to the side members of the frame 11, but not necessarily to the cross member 23. If the latter is mounted lower down on the frame 11 than is shown in the drawings, the lower edges of the envelope 12 and cover 15 are looped around the lower edge of the plate 27 and not around the cross member 23. Under such circumstances, the supporting layer 13 does not extend as far down as the cross member 23, but only as far as the plate 27.

The cover 15 may also be stitched together along its side and bottom front edges instead of using the glove fasteners 34 and 37 as it is not intended to be removed. Optionally conventional slide fasteners may be used to close these edges. The cover 15 may be treated with liquid elastic deformable material or cement in order to protect it from rips, runs, wear and the like.

What I claim is:

1. A seat comprising a frame having side members bent into upwardly inclined back portions, substantially horizontal body-supporting portions and downwardly-inclined front portions; an envelope of elastic deformable material mounted upon said frame and curving around the bent portion thereof, and a transversely-disposed downwardly-curved shaping element engaging said envelope adjacent said frame front portions.

2. A seat comprising a frame having side members bent into upwardly inclined back portions, substantially horizontal body-supporting portions and downwardly-inclined front portions; an envelope of elastic deformable material mounted upon said frame and curving around the bent portion thereof, and a transversely-disposed downwardly-curved shaping element approximately of partially cylindrical configuration engaging said envelope adjacent said frame front portions.

3. A seat comprising a frame having side members bent into upwardly inclined back portions, substantially horizontal body-supporting portions and downwardly-inclined front portions; an envelope of elastic deformable material mounted upon said frame and curving around the bent portion thereof, and a transversely-disposed downwardly-curved shaping element within said envelope and engaging said envelope adjacent said front frame portions.

4. A seat comprising a frame having side members bent into upwardly inclined back portions, substantially horizontal body-supporting portions and downwardly-inclined front portions; an envelope of elastic deformable material mounted upon said frame and curving around the bent portion thereof, and a plurality of transversely disposed shaping elements approximately of partially cylindrical configuration mounted in spaced relationship and respectively engaging the front and rear walls of said envelope adjacent the front portions of said frame.

5. A seat comprising a frame having a rear cross member disposed substantially at the topmost and rearmost portion thereof, a front cross member diposed substantially at the foremost portion of said frame, and laterally spaced substantially parallel side members having approximately L-shaped bent portions with their upper and lower ends secured to the outer ends of said rear and front cross members respectively, said L-shaped bent portions being free from connection with any other members between said rear and front cross members, said side members having leg portions secured to and extending downwardly from said L-shaped bent portions, an approximately L-shaped envelope of elastic deformable material mounted upon said frame and extending downwardly and forwardly over said rear and front cross members and said L-shaped side member portions, and a cushion structure of substantially L-shaped form mounted upon said envelope.

6. A seat comprising a frame having a rear cross member disposed substantially at the topmost and rearmost portion thereof, a front cross member disposed substantially at the foremost portion of said frame, and laterally spaced substantially parallel side members having approximately L-shaped bent portions with their upper and lower ends secured to the outer ends of said rear and front cross members respectively, said L-shaped bent portions being free from connection with any other members between said rear and front cross members, said side members having leg portions secured to and extending downwardly from said L-shaped bent portions, an approximately L-shaped envelope of elastic deformable material mounted upon said frame and extending downwardly and forwardly over said rear and front cross members and said L-shaped side member portions, and a cushion structure of substantially L-shaped form mounted upon said envelope, the upper and side edges of said envelope being closed and the lower edges of said envelope being open and secured to said front cross member, and the lower open edges of said envelope being bent around said front cross-member and secured to one another in oppositely directed overlapping relationship.

CLARENCE V. McGUIRE.

REFERENCES CITED

The following references are of record in the file of this patent:

UNITED STATES PATENTS

| Number | Name | Date |
| --- | --- | --- |
| 2,008,392 | Heller | July 16, 1935 |
| 2,020,028 | Hanauer | Nov. 5, 1935 |
| 2,085,475 | Saives | June 29, 1937 |
| 2,158,225 | Elmore | May 16, 1939 |
| 2,251,318 | Blair et al. | Aug. 5, 1941 |
| 2,281,341 | Turner | Apr. 28, 1942 |

FOREIGN PATENTS

| Number | Country | Date |
| --- | --- | --- |
| 429,528 | Great Britain | May 31, 1935 |